United States Patent [19]

Portis

[11] Patent Number: 5,131,694

[45] Date of Patent: Jul. 21, 1992

[54] JOINT SEAL BETWEEN VALVE BODY AND REMOVABLE PORT

[75] Inventor: Ralph G. Portis, Highland Park, Ill.

[73] Assignee: Midland Manufacturing Corp., Skokie, Ill.

[21] Appl. No.: 660,548

[22] Filed: Feb. 26, 1991

[51] Int. Cl.$^5$ .............................................. F16L 17/06
[52] U.S. Cl. ...................................... 285/351; 285/918; 285/347; 285/350; 277/169
[58] Field of Search ............... 285/347, 349, 350, 351, 285/918; 277/169, 170, 171, 180, 188 R

[56] References Cited

U.S. PATENT DOCUMENTS

| | | | |
|---|---|---|---|
| 1,976,589 | 10/1934 | Trickey | 285/918 |
| 2,110,825 | 3/1938 | Archer | 285/918 |
| 2,481,404 | 9/1949 | Donner | 285/347 |
| 2,829,909 | 4/1988 | Magnani | 285/350 |
| 3,001,804 | 9/1961 | Tomlinson et al. | 285/347 |
| 3,582,113 | 6/1971 | Cauthery . | |
| 3,677,456 | 7/1972 | Ramspeck et al. . | |
| 3,830,588 | 8/1974 | Nagler . | |
| 3,843,282 | 10/1974 | Nagler . | |
| 3,913,885 | 10/1975 | Greenwood et al. . | |
| 3,973,791 | 8/1976 | Porta et al. | 285/347 |
| 3,988,000 | 10/1976 | Reese . | |
| 4,055,359 | 10/1977 | McWethy | 285/351 |
| 4,331,268 | 5/1982 | Chisholm . | |
| 4,433,862 | 2/1984 | Raulins et al. | 285/350 |
| 4,458,926 | 7/1984 | Williamson . | |
| 4,523,765 | 6/1985 | Heidemann . | |
| 4,850,622 | 7/1989 | Suzuki | 285/347 |
| 4,856,851 | 8/1989 | Herring et al. . | |
| 4,917,062 | 4/1990 | Tapper et al. . | |
| 4,934,742 | 6/1990 | Williamson | 285/918 |
| 4,952,868 | 8/1990 | Scherer, III . | |

FOREIGN PATENT DOCUMENTS 2155070  5/1973  Fed. Rep. of Germany ...... 285/351

OTHER PUBLICATIONS

"How Compression Set Affects O-Ring Selection" Article, Hydraulics and Pneumatics, Apr. 1966, pp. 132-132.
Midland Mfg. Corp. 1" Angle Valve Drawing No. A-713-ML.

Primary Examiner—Eric K. Nicholson
Attorney, Agent, or Firm—Emrich & Dithmar

[57] ABSTRACT

An angle valve has a side port bore with a cylindrical inner seal surface chamfered at its outer end and a removable port fitting receivable in the port bore and having a cylindrical outer seal surface in which are formed two axially spaced-apart circumferential grooves, each generally rectangular in transverse cross section. Two seal rings of circular cross section are respectively received in the grooves so as to project radially outwardly therefrom beyond the other seal surface of the fitting. Each ring has a transverse cross-sectional area substantially equal to that of its associated groove so that when the fitting is disposed in the bore the rings are deformed to substantially fill the grooves. The chamfer cooperates with the fitting when inserted in the bore to define an annular cavity which communicates with one of the grooves to form an extension thereof so that the thus-extended groove has a transverse cross-sectional area substantially equal to that of the associated ring so as to be filled thereby when deformed.

9 Claims, 1 Drawing Sheet

JOINT SEAL BETWEEN VALVE BODY AND REMOVABLE PORT

BACKGROUND OF THE INVENTION

1. Field of the Invention

The present invention relates to sealing arrangements for telescopically inter-fitted parts and, in particular, to sealing arrangements for use in valves.

2. Description of the Prior Art

Valves, such as angle valves, are frequently provided with removable or detachable port fittings. In such cases, the seal joint between the valve body and the removable port fitting frequently develops leaks because of the strain or force applied to the fitting when it is coupled to exterior piping. In many applications, such as for tank cars or trucks or barges, the couplings are effected by operators, sometimes poorly trained, using large wrenches and hammers which exert substantial forces and moments which can create a leakage path between the valve body and the detachable port fitting. Also, a slight misalignment of the parts can result in a leak.

Typically, the joint between the valve body and the removable port fitting is sealed with a flat gasket and/or an O-ring, but this type of seal has proven to be insufficient to ensure a leak-free joint. It is known to provide more than one seal ring in a seal joint, but this also has proven to be insufficient to ensure leak free joints in the removable port fittings of large angle valves.

SUMMARY OF THE INVENTION

It is a general object of the present invention to provide an improved seal joint between a valve body and a removable port fitting, which avoids the disadvantages of prior seal joints while affording additional structural and operating advantages.

An important feature of the invention is the provision of a valve construction incorporating a seal joint of the type set forth, which ensures against leaks even under application of high stresses and forces to the removable port member.

In connection with the foregoing feature, it is another feature of the invention to provide a seal joint which is of relatively simple and economical construction.

These and other features of the invention are attained by providing in a valve including a body with a port bore having a cylindrical inner seal surface and a removable port fitting having a cylindrical outer seal surface telescopically received within the port bore, the improvement comprising: a seal groove formed in the outer seal surface of the fitting and extending circumferentially therearound, the groove having a predetermined transverse cross-sectional area, and a resilient deformable seal ring disposed in the groove and in its undeformed condition projecting radially outwardly beyond the outer seal surface of the fitting, the ring having a transverse cross-sectional area substantially equal to that of the groove, whereby when the fitting is disposed in the port bore the ring is deformed by the inner seal surface to substantially fill the groove and provide a fluid-tight seal between the valve body and the port fitting The invention consists of certain novel features and a combination of parts hereinafter fully described, illustrated in the accompanying drawings, and particularly pointed out in the appended claims, it being understood that various changes in the details may be made without departing from the spirit, or sacrificing any of the advantages of the present invention.

BRIEF DESCRIPTION OF THE DRAWINGS

For the purpose of facilitating an understanding of the invention, there is illustrated in the accompanying drawings a preferred embodiment thereof, from an inspection of which, when considered in connection with the following description, the invention, its construction and operation, and many of its advantages should be readily understood and appreciated.

DESCRIPTION OF THE PREFERRED EMBODIMENT

Figure 3:
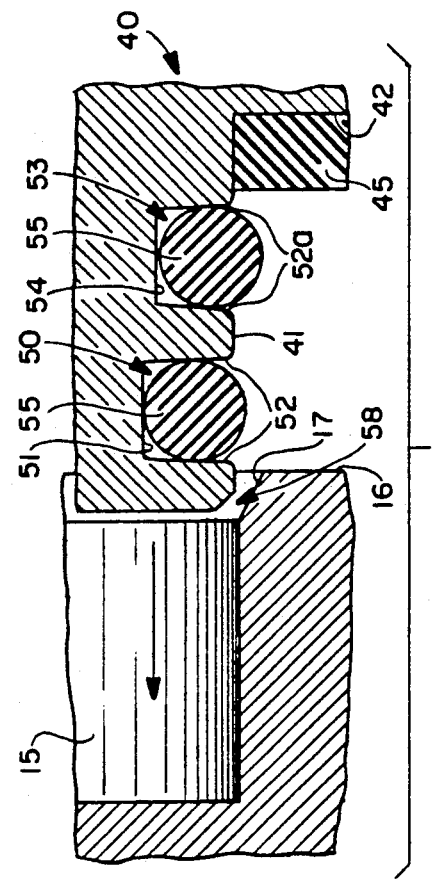
FIG. 3 is a view similar to FIG. 2, illustrating the parts with the port fitting removed from the valve body.

Referring to FIG. there is illustrated an angle valve 10, constructed in accordance with and embodying the features of the present invention. The valve 10 has a body 11 defining therein a chamber 12 which communicates with an axial port bore 13 and a lateral port bore 14, the latter having a cylindrical inner seal surface 15 and terminating at an outer annular surface 16. The inner seal surface 15 is provided with a chamfer 17 at its outer end (see FIG. 3). Projecting upwardly from the body 11 is a cylindrical nipple 18 which is coaxial with a control bore 19 which provides communication between the chamber 12 and the nipple 18.

The nipple 18 projects upwardly from a flat annular end face 20 of the body 11 which is disposed in use in mating engagement with an end face 21 on a control bonnet 22, which defines therein a chamber 23. Formed in the top of the control bonnet 22 is an internally threaded bore 24 which communicates with the chamber 23. The control bonnet 22 is provided with a depending neck 25 which defines a bore which communicates with the chamber 23 and is provided with an enlarged-diameter region 26 at its lower end dimensioned for telescopically receiving therein the nipple 18. The neck 25 terminates in a laterally outwardly extending flange 27 on which is defined the end face 20, the flange 27 being fixedly secured to the body 11 by suitable fasteners 28.

The valve 10 is operated by a control shaft 30 which extends through the bore 24, the chamber 23, the neck 25 and the bore 19 into the chamber 12. The control shaft 30 is provided with a hand wheel 29 at its upper end and has a threaded portion 31 which is threadedly engaged in the bore 24. A packing screw 32 is disposed telescopically between the control shaft 30 and the inner surface of the neck 25, being threadedly engaged with the latter for engaging a packing set 32a disposed within the nipple 18 in surrounding relationship with the control shaft 30. An O-ring 33 provides a seal between the packing screw 32 and the control shaft 30.

Coupled to the inner end of the control shaft 30 is a seal retainer 34 on which is mounted an annular seal 35, the seal retainer 34 being held in place on the control shaft 30 by a U-bolt 36. A tubular port fitting 37 is disposed telescopically within the axial port bore 13, a seal therebetween being provided by a pair of axially spaced-apart O-rings 38. Similarly, a pair of axially spaced-apart O-rings 39 provide a seal between the control shaft 30 and the valve body 11 in the control bore 19.

In operation, as the hand wheel 29 is turned, the control shaft 30 is rotated for axially moving the annular seal 35 into and out of sealing engagement with the inner end of the port fitting 37 for closing and opening the valve 10 for respectively blocking and opening communication between the port bores 13 and 14.

Figure 2:
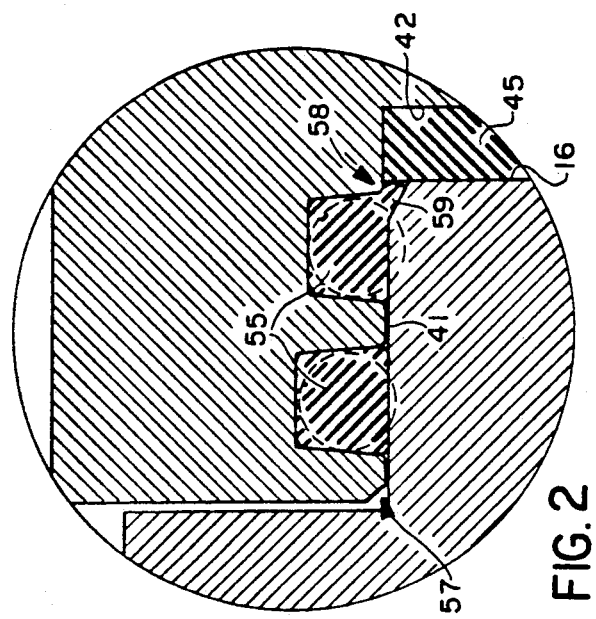
FIG 2 is an enlarged, fragmentary sectional view of the seal joint between the valve body and the removable port fitting of FIG. 1.
Figure 1:
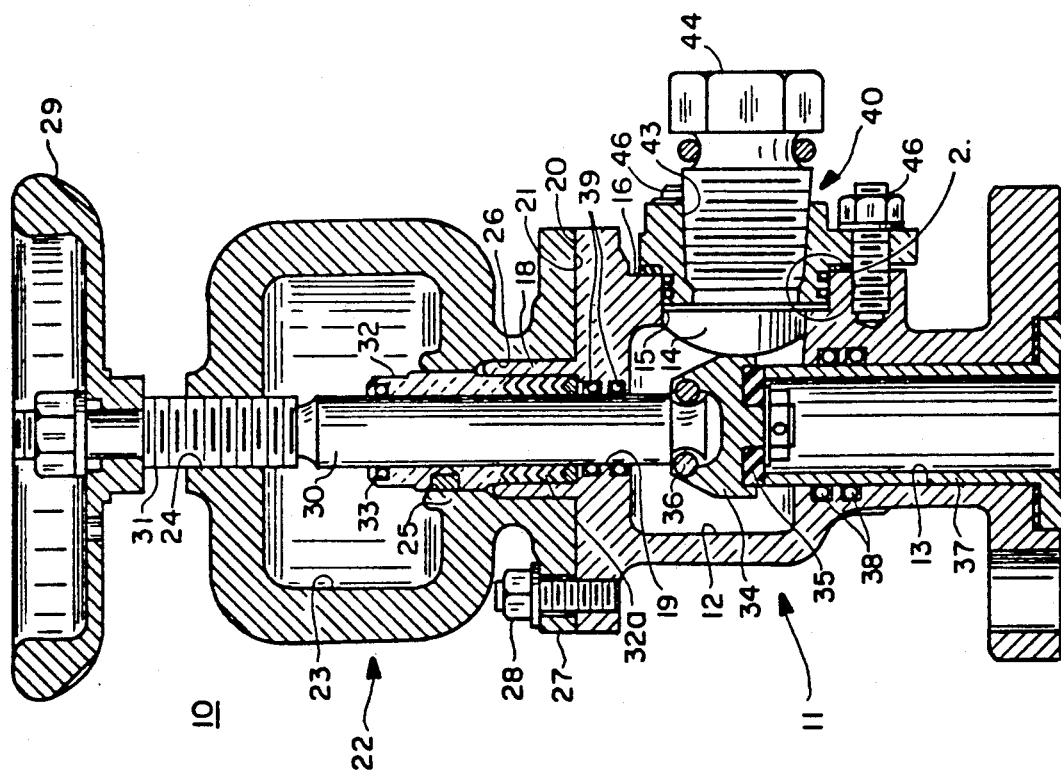
FIG. 1 is a view in vertical section of an angle valve having a removable port fitting incorporating a seal joint constructed in accordance with and embodying the features of the present invention.

Referring now also to FIGS. 2 and 3, a port fitting 40 is removably received in the lateral port bore 14. The fitting 40 has an outer cylindrical seal surface 41 which terminates at an annular radially outwardly extending shoulder 42, the fitting 40 having an internally threaded axial bore 43 extending therethrough for receiving therein a threaded plug 44 to close the port when it is not coupled to associated piping. The port fitting 40 is received coaxially within the lateral port bore 14 until an annular washer 45 disposed on the shoulder 42 bears against the annular surface 16 of the valve body 10, the parts being held together by suitable fasteners 46.

To provide a fluid-tight seal between the port fitting 40 and the valve body 11, two circumferential grooves 50 and 53 are formed in the outer cylindrical seal surface 41 at axially spaced-apart locations therealong. Both of the grooves 50 and 53 are generally rectangular in transverse cross section, but the groove 50 is deeper than the groove 53. The groove 50 has a cylindrical end wall 51 and a pair of side walls 52 which preferably diverge slightly toward the open end of the groove 50. Similarly, the groove 53 has a cylindrical end wall 54 and a pair of very slightly outwardly diverging side walls 52a. Two identical, resilient, deformable O-ring seals 55 are respectively disposed in the grooves 50 and 53, the O-ring seals 55 being circular in transverse cross section.

Preferably, the diameter of the O-ring seals 55 is substantially the same as the average width of the grooves 50 and 53 but is greater than the depths of those grooves so that each ring 55, in its undeformed condition, projects radially outwardly beyond the outer cylindrical seal surface 41 of the port fitting 40 (see FIG. 3).

The outer cylindrical seal surface 41 of the port fitting 40 has a diameter very slightly less than the diameter of the inner cylindrical seal surface 15 of the lateral port bore 14, so as to provide a very slight clearance therebetween (indicated at 57 in FIG. 2) to permit the port fitting 40 to be inserted into the lateral port bore 14. The groove 53 is positioned closely adjacent to the washer 45 so that when the port fitting 40 is inserted in the lateral port bore 14, the chamfer 17 on the inner cylindrical seal surface 15 will cooperate with the port fitting 40 to define an annular cavity 58 (FIG. 3) which communicates with the groove 53 (see FIG. 2), providing an extension thereof and effectively increasing the cross-sectional area thereof.

The parts are so dimensioned that the combined transverse cross-sectional area of the groove 53 and the annular cavity 58 is substantially equal to the transverse cross-sectional area of the groove 50 which is, in turn, substantially equal to the transverse cross-sectional area of each of the O-ring seals 55. Thus, when the port fitting 40 is inserted in the lateral port bore 14, the inner cylindrical surface 15 and the chamfer 17 will serve to deform the O-ring seals 55, as illustrated in FIG. 2, so that one O-ring seal 55 substantially fills the groove 50 while the other substantially fills the groove 53, with a deformed projection 59 therefrom (FIG. 2) substantially filling the annular cavity 58. It has been found that this arrangement provides an effective fluid-tight seal between the port fitting 40 and the valve body 11, which is capable of withstanding the forces applied to the port fitting 40 during coupling and decoupling thereof with respect to associated piping.

From the foregoing, it can be seen that there has been provided an improved valve construction and a seal arrangement therefor which affords an effective seal between the valve body and an associated removable port fitting which is of simple and economical construction and yet can withstand substantial forces in use.

I claim:

1. In a valve including a body with a port bore having a cylindrical inner seal surface and a removable port fitting having a cylindrical outer seal surface telescopically received within the port bore, the improvement comprising: a seal groove formed in the outer seal surface of the fitting and extending circumferentially therearound, said groove being generally rectangular in transverse cross section and having a predetermined transverse cross-sectional area, and a resilient deformable seal ring disposed in said groove and in its undeformed condition projecting radially outwardly beyond the outer seal surface of the fitting, said ring being circular in transverse cross section with a diameter substantially equal to the width of said groove and having a transverse cross-sectional area at least substantially equal to that of said groove, whereby when the fitting is dispose din the port bore the ring is deformed by the inner seal surface to substantially fill the groove and provide a fluid-tight seal between the valve body and the port fitting.

2. The valve of claim 1, wherein the inner seal surface of the port bore has a chamfer at the distal end thereof, said chamfer cooperating with the port fitting when the fitting is disposed in the port bore for defining an annular cavity communicating with said seal groove.

3. The valve of claim 2, wherein the transverse cross-sectional area of said ring is substantially equal to the sum of the transverse cross-sectional areas of said groove and said annular cavity, whereby when the fitting is disposed in the port bore the ring is deformed substantially to fill the groove and the cavity.

4. In a valve including a body with a port bore having a cylindrical inner seal surface and a removable port fitting having a cylindrical outer seal surface telescopically received within the port bore, the improvement comprising: two seal grooves formed in the outer seal surface of the fitting and extending circumferentially therearound, each of said grooves being generally rectangular in transverse cross section and having a predetermined transverse cross-sectional area, and two resilient deformable seal rings respectively dispose din said grooves and each in its undeformed condition projecting radially outwardly beyond the outer seal surface of the fitting, each of said rings being circular in transverse cross section with a diameter substantially equal to the width of the groove in which it is disposed and having a transverse cross-sectional area at least substantially equal to that of the groove in which it is disposed, whereby when the fitting is disposed in the port bore the rings are deformed by the inner seal surface to substantially fill the grooves and provide a fluid-tight seal between the valve body and the port fitting.

5. The valve of claim 4, wherein said grooves are spaced apart axial of the port bore.

6. The Valve of claim 4, wherein said rings have the same transverse cross-sectional area.

7. The valve of claim 4, wherein the inner seal surface of the port bore has a chamfer at the distal end thereof, said chamfer cooperating with the port fitting when the fitting is disposed in the port bore for defining an annular cavity communicating with one of said seal grooves to provide an extension thereof and effectively increase the cross-sectional area thereof.

8. The valve of claim 7, wherein the sum of the transverse cross-sectional areas of said one groove and said annular cavity is substantially equal to the transverse cross-sectional area of said ring disposed therein, whereby when the fitting is disposed in the port bore the ring is deformed substantially to fill the groove and the cavity.

9. In a valve including a body with a port bore having a cylindrical inner seal surface and a removable port fitting having a cylindrical outer seal surface telescopically received within the port bore, the improvement comprising: two seal grooves respectively having different depths formed in the outer seal surface of the fitting and extending circumferentially therearound, each of said grooves having a predetermined transverse cross-sectional area, and two resilient deformable seal rings respectively disposed in said grooves and each in its undeformed condition projection radially outwardly beyond the outer seal surface of the fitting, each of said rings having a transverse cross-sectional area substantially equal to that of the groove in which it is disposed, whereby when the fitting is disposed in the port bore the rings are deformed by the inner seal surface to substantially fill the grooves and provide a fluid-tight seal between the valve body and the port fitting.

* * * * *

UNITED STATES PATENT AND TRADEMARK OFFICE
CERTIFICATE OF CORRECTION

PATENT NO. : 5,131,694

DATED : July 21, 1992

INVENTOR(S) : Ralph G. Portis

It is certified that error appears in the above-identified patent and that said Letters Patent is hereby corrected as shown below:

Column 4, line 59, "dispose din" should be --disposed in--; and

Column 6, line 13, "projection" should be --projecting--.

Signed and Sealed this

Fifth Day of October, 1993

Attest:

BRUCE LEHMAN

Attesting Officer     Commissioner of Patents and Trademarks